(12) United States Patent
Bar Noy

(10) Patent No.: US 9,187,110 B2
(45) Date of Patent: Nov. 17, 2015

(54) WHEELED CARRYING DEVICE

(71) Applicant: NEXT GENERATION STRETCHER LTD., Ramat Gan (IL)

(72) Inventor: Ilan Bar Noy, Ramat Gan (IL)

(73) Assignee: NEXT GENERATION STRETCHER LTD., Ramat Gan (IL)

( * ) Notice: Subject to any disclaimer, the term of this patent is extended or adjusted under 35 U.S.C. 154(b) by 0 days.

(21) Appl. No.: 14/294,876

(22) Filed: Jun. 3, 2014

(65) Prior Publication Data
US 2014/0284902 A1 Sep. 25, 2014

Related U.S. Application Data

(63) Continuation-in-part of application No. 13/258,524, filed on Sep. 22, 2011, now Pat. No. 8,770,615.

(51) Int. Cl.
*A61G 1/02* (2006.01)
*B62B 3/02* (2006.01)

(52) U.S. Cl.
CPC .............. *B62B 3/02* (2013.01); *B62B 2202/42* (2013.01); *B62B 2206/04* (2013.01); *B62B 2301/14* (2013.01); *B62B 2301/20* (2013.01)

(58) Field of Classification Search
CPC .. B62B 2202/42; B62B 3/02; B62B 2206/02; B62B 1/002; B62B 2301/00; B62B 2301/14; B62B 2301/20; B62B 5/068; B62D 63/064
USPC .......... 280/87.042, 47.34, 603; 296/20; 5/625
See application file for complete search history.

(56) References Cited

U.S. PATENT DOCUMENTS

| 3,305,243 | A | * | 2/1967 | Manfredi, Jr. et al. | ........ 280/651 |
| 4,128,258 | A | * | 12/1978 | Johnson | ........ 280/656 |
| 5,997,018 | A | * | 12/1999 | Lee | .......... 280/87.042 |
| 6,186,524 | B1 | * | 2/2001 | McQueeny et al. | ...... 280/87.021 |
| 7,484,741 | B2 | * | 2/2009 | Kay, III | .................... 280/87.042 |

* cited by examiner

*Primary Examiner* — Hau Phan
*Assistant Examiner* — Bryan Evans
(74) *Attorney, Agent, or Firm* — JMB Davis Ben-David

(57) ABSTRACT

A man-powered (e.g. manually pulled or pushed) multipurpose wheeled carrying device with ground clearance for transporting people, animals, equipment and goods over unsurfaced roads or tracks. The carrying device may include a chassis, a front dependent suspension and a rear dependent suspension, wherein each of the dependent suspensions comprises a legged solid axle, a connector, springs, and wheels. The legged solid axles of the dependent suspensions are adapted to keep the chassis at least 6 inches above the ground surface. The dependent suspensions are tiltable around a longitudinal axis of the chassis to keep the chassis leveled while all of the wheels are in contact with the ground, and to provide ground clearance during use.

17 Claims, 4 Drawing Sheets

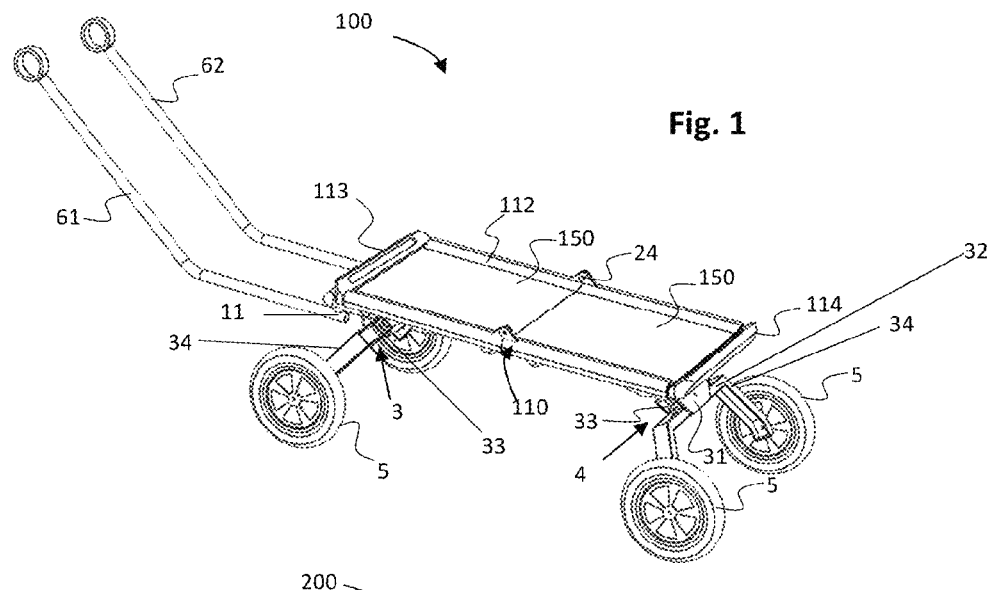
Fig. 1
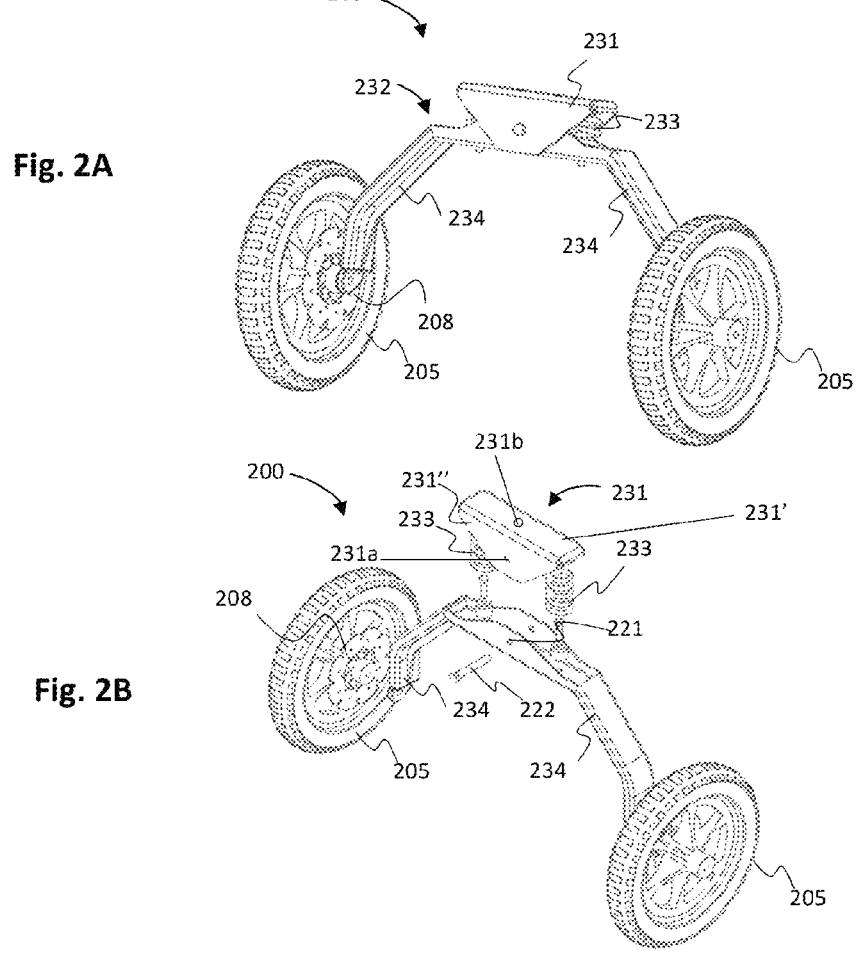
Fig. 2A
Fig. 2B

US 9,187,110 B2

WHEELED CARRYING DEVICE

CROSS REFERENCE TO RELATED APPLICATIONS

This application is a Continuation In Part (CIP) of U.S. patent application Ser. No. 13/258,524, filed on Sep. 22, 2011, which is incorporated in its entirety herein by reference.

FIELD OF THE INVENTION

The present invention relates to a man powered (e.g. manually pulled or pushed) multipurpose wheeled carrying device with ground clearance for transporting people, animals, equipment and goods over unsurfaced roads or tracks, made of materials such as sand, gravel, riverbeds, mud, rocks, and other natural terrain or, for example, devastated urban areas.

BACKGROUND OF THE INVENTION

In many situations such as military operations, hunting expeditions, rescue operations, climbing and caving expeditions, wilderness explorations, off-road sport events and the like, it is common to carry loads, such as supplies, people, such as wounded people or young children, equipment, such as hunting gear, game and the like.

It is common today for carrying devices to be collapsible or otherwise foldable, such that one member of the party can carry it on his back, and in case of need the carrying device can be unfolded and deployed. For example, a collapsible device for carrying wounded people, such as a stretcher, may be unfolded and deployed, and a wounded person can then be placed on the stretcher, which is then carried by two or four persons.

However, experience shows that carrying a stretcher bearing a wounded person for long distances and/or in rough terrain can be rather cumbersome and slows the progress of the party in reaching points where medical treatment may be administered. In some cases this endangers the life of the wounded person. In the case of military operations during combat, the slow progress caused by the stretcher, and requirement of multiple stretcher bearers to carry the stretcher, may endanger the other soldiers in the party and hamper the unit's ability to achieve its objectives.

In another example, when carrying device is a game cart, it may be unfolded and deployed, and loaded with the game. However, absent sufficient navigability of the game cart, it would not assist in carrying the hunt back to camp.

Hence, an improved device for transporting loads over rough terrain, such as unsurfaced roads or tracks, made of materials such as sand, gravel, riverbeds, mud, rocks, and other natural terrain or, for example, devastated urban areas, is still a long felt need.

SUMMARY OF THE INVENTION

Embodiments of the invention include a system for carrying loads over unsurfaced roads or tracks, with a wheeled, carrying device. The wheels of the device allow it to be pulled or pushed by a single person, even when the device bears upon it a heavy load, such as a wounded person or game, and even in relatively rough and bumpy terrain.

Embodiments of the invention include a multipurpose, collapsible, wheeled carrying device having four wheels, with each two wheels on a dependent suspension. The suspensions may be additionally supplied with independent shock absorbing means. The suspensions take the form of legged solid axles upon which the wheels revolve. These legged axles may rotate in the horizontal plane to allow the carrying device to turn left/right, and may also rotate in a vertical plane allowing one wheel to rise while the other stays level to the ground. The carrying device may be pulled by means of a pulling handle or rope that allows the person pulling the carrying device to rotate the front suspension in the horizontal plane. The carrying device is collapsible such as by folding or by telescopic collapse. According to some embodiments, when the device is unfolded, its length may be adjusted by extensions deployable from the front end and the rear end of the device.

In some embodiments of the invention a steering mechanism is employed whereby turning the steering handles and pulling the carrying device causes tilting of the transport surface and consequent change in the wheel angles to a desired direction. Due to the geometry of the device, the tilt in the chassis will cause a corresponding turn in the rear wheels in the direction opposite to the turn of the front wheels, tightening the turn radius and increasing the stability of the device during cornering.

In some embodiments of the invention the carrying device size may be modified by means of members having adjustable length, by telescopic or other methods.

According to some embodiments of the present invention, a wheeled foldable carrying device is provided. The carrying device may comprise: a chassis, a front dependent suspension and a rear dependent suspension wherein each of the dependent suspensions comprises a legged solid axle, a connector, springs, and wheels, wherein the legged solid axles of the dependent suspensions may be adapted to keep the chassis at least 6 inches above the ground surface, and wherein the dependent suspensions are tiltable around a longitudinal axis of said chassis to keep the chassis leveled while all of the wheels are in contact with the ground.

According to some embodiments the device may be a game cart. According to other embodiments, the carrying device is a baby stroller.

According to some embodiments, when folded the carrying device may be adapted to have only two wheels in contact with the ground when in use for carrying loads.

According to other embodiments of the present invention, when in use the legged solid axles may be substantially inverted U shaped or inverted V shaped.

The device according to some embodiments, may further comprising one or more handles attached to the chassis, adapted for steering the device by means of rotating at least one of the front suspension and the rear suspension. According to some embodiments, the front suspension and the rear suspension are connected to the chassis in an angle so that the end of the front suspension that is connected to the wheels, extends outwardly towards a front end of the device; and the end of the rear suspension that is connected to the wheels extends outwardly towards a rear end of the device.

According to yet additional embodiments, the carrying device is usable in both a folded mode and an unfolded mode. In the unfolded mode, the length of the device may be adjustable, by deployable extensions extendable frontwards and rearwards from the chassis.

According to some embodiments of the present invention, the device may be manually driven (e.g. pulled or pushed by the force of a human).

According to some embodiments, the legs of the dependent suspensions are adapted to elevate the chassis of said carrying device above a ground surface. For example, the legs may be from several inches in length to a foot or more in length. Such lengths allow the chassis to pass over bumps, rocks or other obstacles that would otherwise be impeded by or scrape against the bottom of the chassis. For example, when the chassis carries a stretcher, the extended legs may allow the stretcher to pass over bumps or rocks that would otherwise impede or scrape against the bottom of the stretcher.

According to some embodiments, the carrying device is transformable from a first operation mode to a second operation mode. The first operation mode may be a folded mode in which a backpack, medic-bag or any other relatively small load may be carried by the device, and the second operation mode may be an unfolded mode. The unfolded mode may be for carrying loads such as equipment and hunting gear, hunt and the like. The unfolded mode may be used both in an undeployed form and in a deployed form. According to some embodiments, the carrying device may be deployed, by opening extensions in the front and rear ends of carrying device to allow the adjustment of length of carrying device according to the size of the load. For example, when the carrying device is used as a stretcher, it may be unfolded and deployed to allow an adult to lie thereon in comfort.

According to some embodiments, the device may be a stretcher. According to other embodiments, the carrying device may be a baby stroller, a game cart and the like.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1 is a schematic illustration of a manually driven wheeled carrying device according to embodiments of the present invention in an unfolded and undeployed position;

FIGS. 2A and 2B are schematic illustrations of suspensions in a complete view and an exploded view, according to embodiments of the present invention;

Figure 3A:
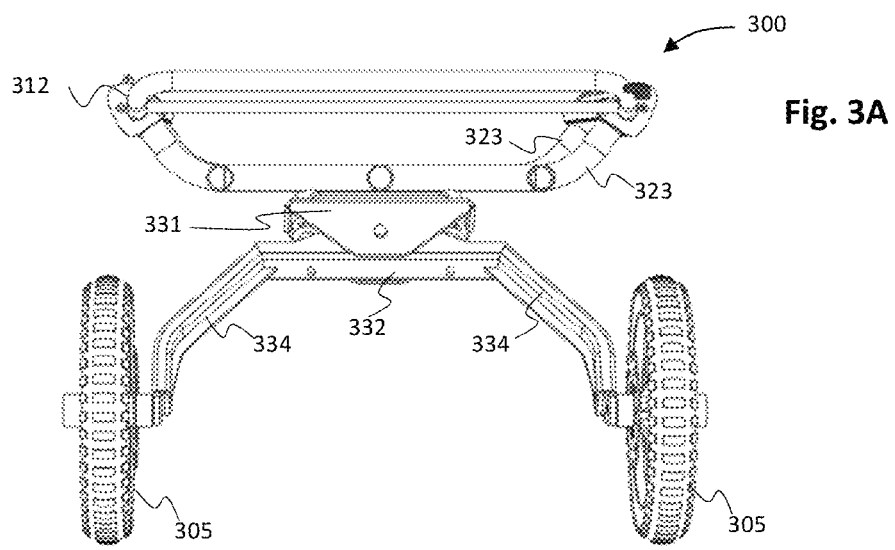
FIGS. 3A and 3B are cross section illustrations of a manually driven wheeled carrying device in a leveled position and in a tilted position according to some embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The following description is provided, alongside all chapters of the present invention, so as to enable any person skilled in the art to make use of said invention and sets forth the best modes contemplated by the inventor of carrying out this invention. Various modifications, however, will remain apparent to those skilled in the art, since the generic principles of the present invention have been defined specifically to provide a means and method for providing a wheeled carrying device.

In the following detailed description, numerous specific details are set forth in order to provide a thorough understanding of embodiments of the present invention. However, those skilled in the art will understand that such embodiments may be practiced without these specific details. Reference throughout this specification to "one embodiment" or "an embodiment" means that a particular feature, structure, or characteristic described in connection with the embodiment is included in at least one embodiment of the invention.

The term 'plurality' refers hereinafter to any positive integer larger than 1 e.g., 2, 5, or 10.

The term 'dependent suspension' may refer hereinafter to a legged suspension system for a wheeled vehicle wherein two wheels are attached by legs to a shared, rigid axle (also known as a solid axle). The wheels may spin independently, but movement of the axle will cause coupled movements of the wheels, as they are both attached to the axle, via the legs.

The term "legged solid axle" may refer hereinafter to a solid axle with legs creating a U shaped axle, or a V shaped axle used in a dependent suspension as defined above. Generally the axle may be allowed several degrees of freedom such as rotation in horizontal and vertical directions, for example perpendicular to the wheel rotation axis. The dependent suspension may assure constant camber.

The term 'independent suspension' refers hereinafter to a suspension system for a wheeled system wherein the wheels are allowed completely independent motion, as is the case for most passenger vehicles such as the wishbone or A-arm suspensions.

The term 'wheel axis' refers hereinafter to the axis about which a wheel rotates when a vehicle is traveling in a straight line.

The term 'vertical axis' refers hereinafter to an axis about which an axle rotates in order to allow a vehicle to turn. The vertical axis will generally be perpendicular to the plane upon which the vehicle travels.

The term 'horizontal axis' refers hereinafter to an axis about which an axle rotates in order to allow the wheels to rise and fall. The horizontal axis will generally be in the direction of travel.

The term 'load' refers hereinafter to an object that may be borne by the carrying device of the invention including a wounded person, a healthy person, first aid supplies, equipment, food, camping gear, climbing gear, hunting gear, weapons, ammunition, communications equipment and designated bags such as warrior backpack or medic-bag, and the like.

In an embodiment of the present invention, illustrated in FIG. 1, a carrying device 100 is provided comprising a central chassis 110, a front suspension 3, a rear suspension 4, four wheels 5, and pulling/pushing handles 61, 62. Suspensions 3 and 4 may be for example dependent suspensions.

According to some embodiments of the present invention, each of the dependent suspensions 3, 4 comprises a legged solid axle 32, a connector 31, springs 33, and wheels 5, wherein the legged solid axles 32 of the legged dependent suspensions 3, 4 may be adapted to keep the chassis at least 6 inches above the ground surface, and wherein the dependent suspensions 3, 4 are tiltable around a longitudinal axis of chassis 110 to keep chassis 110 leveled while all of wheels 5 are in contact with the ground.

According to some embodiments, the legged dependent suspensions 3, 4 may allow a ground clearance of at least 8 inches. According to other embodiments at least 12 inches ground clearance may be archived using dependent suspensions according to embodiments of the present invention. It should be appreciated that other ranges of ground clearance may be received using longer legs 34 and/or wheels with a larger diameter.

Central chassis 110 may comprise a peripheral frame 112, and may have a front end 113 and a rear end 114. Frame 112 may in some embodiments be of dimensions similar to those found in standard carrying devices for gear and loads such as human bodies, and may in some embodiments assume a roughly rectangular form. In some embodiments, a hinged section 24 allows the device to fold into two parts. It is within provision of the invention to additionally or alternatively provide further hinged sections and telescoping elements, allowing more compact fold and/or collapse, by hinge means and/or telescoping means and/or folding means as will be obvious to one skilled in the art.

In one embodiment of the invention, when fully deployed, the length of the chassis may be, for example, 190 cm, and the width may be, for example, 52 cm, approximately. However, other dimensions fall under purview of the invention, and it is further within provision of the invention that the actual dimensions of the device (including its length and width) be adjustable by suitable use of telescoping sections or other means as will be clear to one skilled in the art.

Figure 3B:
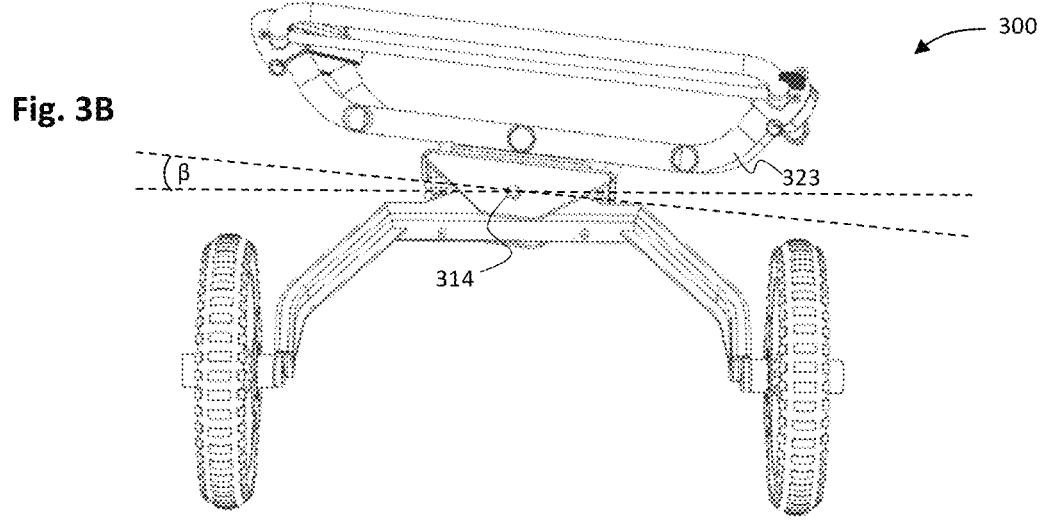
Figure 5:
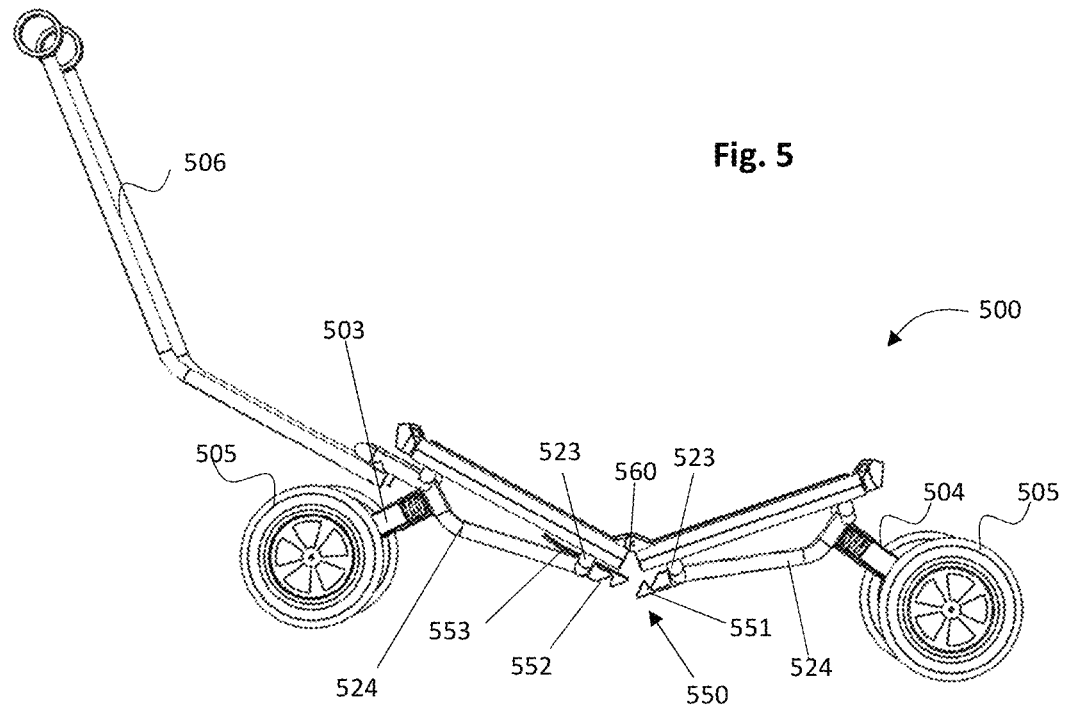
FIG. 5 is a schematic illustration of a manual carrying device according to embodiments of the present invention during folding thereof.

In order that central chassis 110 be strong enough to carry heavy loads and be stable under high velocity operation and/or in rough terrain, chassis 110 may further comprise reinforcing cross-members as shown for example in FIGS. 3A, 3B and 5, comprising both length cross-members (524 in FIG. 5) and width cross-members (323 in FIGS. 3A and 3B). The length cross-members 424 as well as the peripheral framework 112 are in this embodiment both supplied with hinged sections 24 in order for the device to be foldable. In order to affix the load into carrying device 100, according to some embodiments of the present invention, cross members 323 may be lower (in the horizontal plane) than peripheral frame 112 by (for example) a few centimeters, decreasing the possibility that the injured person (or limbs thereof), or any other material or load being borne by carrying device 100) will roll out of carrying device 100. It would be appreciated by those skilled in the art that cross-members 323 may also serve to protect the load (e.g. an injured person) from harm and damage caused by objects projecting from the ground or road such as stones and rocks, branches and the like, scraping against the load from the terrain beneath the chassis. According to some embodiments, sheets 150, such as fabric sheets, foam mattresses, air mattresses, or the like may be placed upon or around central chassis 110 for purposes of comfort, waterproofing, water floating, bulletproofing, and the like. Sheets 150, placed upon or around chassis 110 may fold along with central chassis 110, and thus do not hinder the folding thereof. Likewise, in some embodiments of the invention chassis 110 is covered with a rigid substrate such as a backboard having two halves or a baby stroller having a back part and a seat part, allowing the rigid substrate (e.g. the backboard or the baby stroller) to be folded along with carrying device 100 in a single folding operation.

The handles 61, 62 are connected to the front part of the central chassis 110. According to some embodiments, handles 61, 62 are made of two tubes which are connected to the right and left sides of the front part of the central chassis 110 by means of a hinged connection 11, in order for handles 61, 62 to be able to rotate relative to carrying device 100. When carrying device 100 is not in use, or when used in a folded form, handles 61, 62 may be folded and rotated around hinged connection 11, having a rotation axis vertical to the plane of chassis 110 (i.e. the plane of sheets 150) of carrying device 100, to change the direction of handles 61, 62 in up to 180°.

Hinged connection 11 may include, according to some embodiments, a locking mechanism for stopping the rotation of the handle relative to the carrying device 100, allowing the user to fix the handle in a desired position comfortable for the person pulling the carrying device. By so doing the user ensures maximal steering action. This may be accomplished for instance by means of pins penetrating holes in the handle and corresponding holes in the body of the carrying device.

In one embodiment handles 61, 62 may be provided as two independent parts, or as a single connected unit. As will be obvious to one skilled in the art the same provisions may be made for the rear handles (not shown) which may be used for pushing device 100, for example for assistance when climbing a slope. It is further within provision of the invention that straps, rope, bungee cord, harness, or the like may be used instead or in combination with handles 61, 62 for purposes of pulling the device.

According to some embodiments, device 100 may be braked for example by a brake handle (not shown), by pulling from the rear by means of handle or rope, by rope-operated brake cable from the front or rear, by brakes operated by the vehicle occupant, and combinations thereof, to operate a brake, such as disk brake 208 (in FIGS. 2A and 2B). Similar braking means will be obvious to one skilled in the art, and it is within provision of the invention to supply such means in some embodiments.

According to some embodiments of the invention, carrying device 100 may comprise a connecting device allowing carrying device 100 to be pulled by a standard tow hook, trailer hitch, tractor hookup, tractor hitch, Medical Evacuation (Medevac) helicopter cable, All Terrain Vehicle (ATV) or may be lifted and secured to a Medevac helicopter, and the like.

It should be emphasized that due to the solid-axle construction of suspensions 3 and 4, a naturally stable turning mechanism results whereby (for instance) a left turn of the front axle causes a leftwards tilt of the device and a corresponding right turn of the rear axle, tending to decrease the turn radius and improve the handling characteristics of the device.

According to some embodiments of the present invention, each of dependent suspensions 3 and 4 of carrying device 100 may comprise, according to some embodiments, an axle 32, legs 34, a connector 31 to connect axle 32 to central chassis 110 and at least two shock absorbing springs 33. Suspensions 3 and 4 will be further described with reference to FIGS. 2A and 2B.

The front suspension 3 and rear suspension 4 (as shown in FIG. 1) are similar, and thus only the front suspension will be described in detail, with reference to FIGS. 2A and 2B.

According to embodiments of the present invention, suspension systems 200 may comprise: a connector 231, an axle 232, and two springs 233. At least one wheel 205 may be attached to the end of each of legs 234 of axle 232. According to some embodiments connector 231 is designed in the form of a central rectangular prism 231'. From central rectangular prism 231', trapezoidal, or other geometrical forms 231" are attached at right angles. Each of geometrical forms 231", have at least one hole 231a designed to allow connector 231 to attached to the axle 232. Connector 231 is connected to the chassis (110 in FIG. 1) by means of a cylindrical pin (not shown) which penetrates a hole 231b in central rectangular prism 231' and a corresponding hole on the chassis, and allows connector 231 to rotate relative to carrying device chassis (110 in FIG. 1) about the axis of the pin.

According to some embodiments of the present invention, axle 232 may be shaped in this example roughly in the form of a central bar with two legs 234. The central bar portion of axle 232 includes a horizontal hole 221 designed to allow a pin 222 to rotatably attach axle 232 to connector 231 by penetrating hole 221 in the axle and holes 231a in connector 231. As will be appreciated by one skilled in the art, this manner of connection allows relative rotation between the connector 231 and axle 232 about the axis of connecting pin 222. This degree of freedom in effect allows wheels 205 rise and fall to conform to the terrain on which they travel, while compressing one of springs 233 on one side of connector 231 and expending another one of springs 233 on the other side of connector 231.

According to some embodiments of the present invention, in each of legs 234 of the central axle 232 there is a wheel pin (not shown) designed to rotatably attach wheels 205 to legs 234 of axle 232. In order to dampen vibrations of travel upon rough surfaces, the suspension 200 may include one or more springs 233 connecting the lower part of connector 231 to the upper part of axis 232.

The design of one embodiment of the dependent suspension allows the carrying device to be dragged on surfaces that are not flat without unduly affecting the horizontal disposition of the carrying device frame. This is due to the action of the suspension which allows movement of the wheels about the three axes described above, namely the "wheel axis" of wheels pin (not shown), the "horizontal axis" of pin penetrating hole 221, and the "vertical axis" of the pin connecting connector 231 to chassis (110 in FIG. 1). As will be appreciated by one skilled in the art, rotations of the axle about the horizontal axis and vertical axis are coupled when the wheels contact the ground. Thus when the axle 232 rotates about the vertical axis, the right wheel (for instance) will rotate ahead of the left wheel allowing a left turn, and due to the aforementioned coupling, a corresponding rotation will occur around the horizontal axis 221 causing connector 231 and carrying device (100 in FIG. 1) to tilt towards the right, as is shown in FIG. 3B. Rear suspension system 4 of the carrying device 100 is similar to that of the front suspension 3 and its operation equivalent.

Wheels 205 of carrying device 100 are connected by pins (not shown) to legs 234 to axle 232. It is within provision of the invention to use different suspension means that will be familiar to those skilled in the art, for example such as those used in mountain boards, skateboards, and the like. Axle 232 may have a planar section 231' that is suitable to bear a corresponding planar section of the carrying device, thereby firmly coupling axle 232 to the carrying device while allowing a rotational degree of freedom to axle 232 (as axle 232 may rotate in the horizontal plane, relative to the carrying device).

Reference is now made to FIGS. 3A and 3B which are cross section illustrations of a wheeled carrying device, according to embodiments of the present invention, in a leveled position and in a tilted position. As seen in FIG. 3A, cross members 323 of carrying device 300, may be connected to connector 331 of suspension (3 and 4 in FIG. 1). Axle 332 may rotate in the horizontal plane around a longitudinal axis of carrying device 300 (i.e. an axis crossing the carrying device from the front end to the rear end thereof, which is parallel to the surface 150 of carrying device and substantially parallel to the ground when in use), as may be seen in FIG. 3B, in which carrying device 300 is seen in a tilted position around the longitudinal axis of carrying device 300.

Figure 4A:
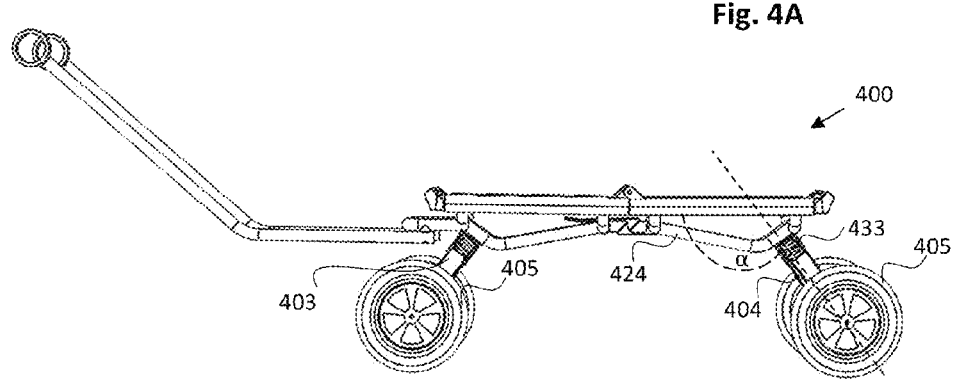
FIG. 4A is a side view illustration of the carrying device of FIG. 1 in an undeployed position.

Reference is now made to FIG. 4A illustrating a connection of a suspension 404 to length cross-member 424 of central chassis 402. As seen in FIG. 4A, suspension 404 may be connected to chassis 402 in an angle α, wherein angle α is larger than 90°, so that the end of suspension 404 connected to wheel 405 is extending outwardly towards the closest end of carrying device 400.

According to some embodiments, front suspension 403 and rear suspension 404 are connected to chassis 402 in an angle so that the end of front suspension 403 that is connected to wheels 405, extends outwardly towards a front end of device 400; and the end of rear suspension 404 that is connected to wheels 405 extends outwardly towards a rear end of device 400.

According to some embodiments of the present invention, springs 433 (33 in FIG. 1, 233 in FIGS. 2A and 2B) of suspension 404 may be adjustable in one or more ways. In some embodiments of the invention this is accomplished by allowing springs 433 (33 in FIG. 1, 233 in FIGS. 2A and 2B) to slide radially outward along the axles (32 in FIG. 1, 232 in FIGS. 2A and 2B) with provision to lock the springs into place as desired. As will be clear to one skilled in the art this will tend to increase the stiffness of the suspension due to the increased torque provided by the spring at an increased radius from the center of rotation (314 in FIG. 3B). In other embodiments of the invention springs 433 may be adjusted to increase or decrease their tension when in equilibrium, such as by means of a screw that raises or lowers one end of the spring. By these means and/or similar such as will be obvious to one skilled in the art, the stiffness and handling characteristics of carrying device (100 in FIG. 1) can thus be adjusted to different occupant weights and different terrain.

Figure 4B:
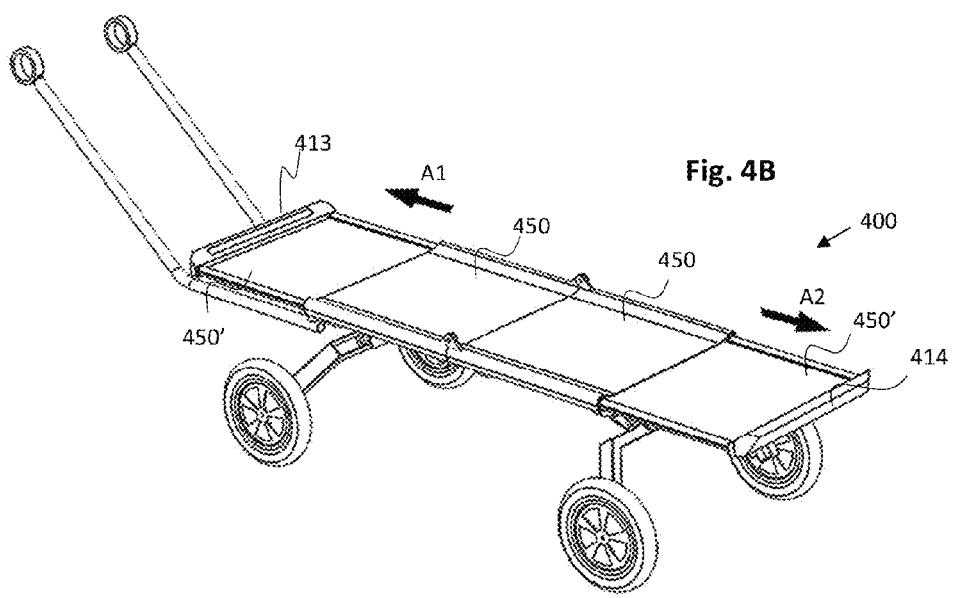
FIG. 4B is an illustration of the carrying device of FIG. 1 in a deployed position.

Referring now to FIG. 4B an unfolded and deployed carrying device 400 is depicted. As may be seen in FIG. 4B carrying device 400 may comprise load bearing surfaces 450. According to some embodiments, one or more of front end 413 and rear end 414 of carrying device 400, may be extended by deploying one or both extensions 450', thus allowing the adjustment of the length of carrying device 400 in accordance with the size of the load to be carried. For example, when carrying equipment such as infantry equipment in battle, carrying device 400 may be operated in an un-deployed form as the dimensions of the load may fit the dimensions of carrying device 400 in its undeployed configuration. If, however, carrying device 400 is required as a stretcher, the infantry equipment may be removed; extensions 450' may be opened outwardly, along arrows A1 and A2, to extend the length of carrying device 400 to fit the height of a lying adult.

According to some embodiments of the present invention, locking and securing elements may be provided to lock extensions 450' in a deployed position. According to some embodiments, extensions 450' may be locked of secured in a partially deployed position, to allow variably adjusting the length of carrying device 400.

Reference is now made to FIG. 5 which is a schematic illustration of a carrying device 500 in a partially folded position and of a locking mechanism 550 of carrying device 500 according to embodiments of the present invention.

According to embodiments of the present invention, carrying device 500 may be utilized in a folded position as well as in an unfolded position (as seen, for example in FIGS. 1, 4A, 4B and 6). In order to allow the folding of carrying device 500 and the locking of carrying device 500 in an unfolded position, embodiments of carrying device 500 may comprise a locking mechanism 550.

Locking mechanism 550 may be a snap on mechanism comprise a fixed side 551 and a dynamic side 552. According to some embodiments, dynamic side 552 of locking mechanism 550 may be connected to a release handle on handle 506 via a release cable that when operated, temporarily changes the position of dynamic side 552 to release the snap lock of locking mechanism 550. According to some embodiments locking mechanism 550 may further comprise a locking pin to secure the locking of carrying device 500 in an unfolded position.

As may be further seen in FIG. 5, when locking mechanism 550 is unlocked, carrying device 500 may fold around a central hinge 560. It would be appreciated that more than one locking mechanisms 550 may be included in a carrying device to allow folding carrying device 500 to more than two parts.

Carrying device 500 is designed to be folded or otherwise collapsed when not in use and for some specific uses in a folded state, and therefore it is within provision of the invention that central chassis 510 may be folded at one or more points, such that the different sections of chassis 510 (between folding points) fold one upon another, in the fashion of an accordion fold, map fold, other fold, telescoping action, or other means as will be clear to one skilled in the art. The simple case of a single folding axis about which two halves fold, is illustrated in FIG. 5 and the folded configuration being shown in FIG. 6. In order for the chassis 510 to be foldable, the peripheral frame (112 in FIG. 1) and the lengthwise supporting members 524 are provided with hinged sections 560. The hinge mechanism 560 is preferably of a type that allows locking of the hinge, preventing folding of the device when deployed, while allowing unlocking of the hinge and subsequent folding of the carrying device when not in use or for using in a folded form for bearing relatively small loads such as backpacks, bags and the like.

In one embodiment when the carrying device is not in use it is possible either to carry it in its folded configuration (for example on one's back in the manner of a backpack) or pull it, either in its unfolded configuration or in a folded configuration. It is within provision of the invention that in the folded configuration, the wheels are coplanar and extend beyond the other parts of the folded carrying device, allowing the carrying device to travel on two wheels similar to the fashion in which a wheeled trolley suitcase may be pulled. Such a configuration is shown for example in FIG. 6.

Figure 6:
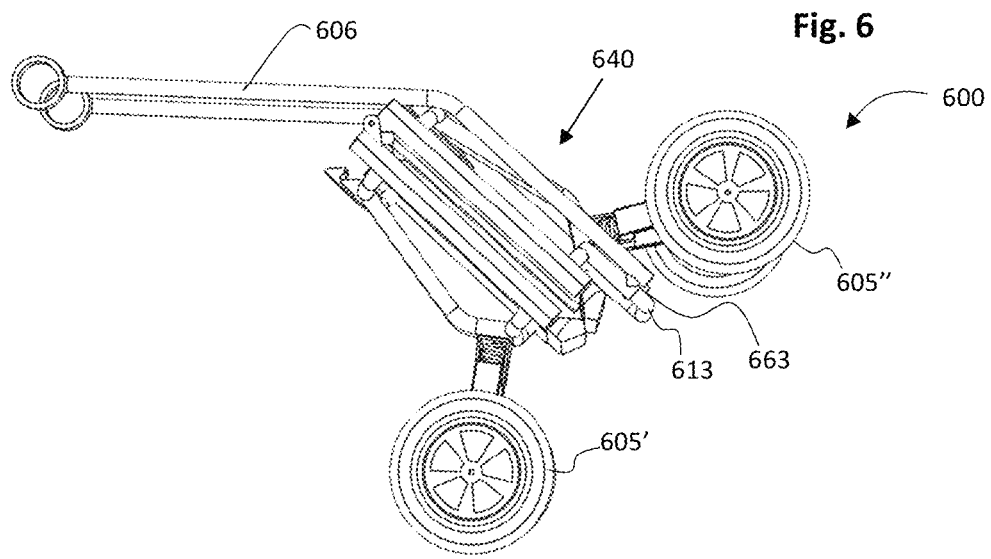
FIG. 6 is an illustration of a manual carrying device according to embodiments of the present invention as may be used when in a folded position.

The carrying device according to one embodiment in a folded state is shown in FIG. 6. As may be seen in FIG. 6 carrying device 600 may have a first pair of wheels 605' that may be the wheels bearing carrying device 600 when used in the folded state, and a second pair of wheels 605" which may not be in contact with the ground when device 600 is in use in its folded state. According to some embodiments of the present invention, pair of wheels 605' may be the rear wheels of carrying device 600 when carrying device 600 is unfolded, while second pair of wheels 605" may be the front wheels of device 600 when device 600 is unfolded. It would be further understood to those skilled in the art that handles 606 may be connected to end 613 of carrying device 600 by a vertical hinge 663 allowing handles 606 to rotate around vertical hinge 663, through the sides of carrying device 600.

According to some embodiments, when device 600 is in a folded state, relatively small loads may be carried by device 600. For example, a backpack, such as a soldier backpack, medic bag or other small bags and loads may be mounted on load frame 640 created from the front portion of chassis (110 in FIG. 1), longitudinal cross-members (524 in FIG. 5) and front dependent suspension (503 in FIG. 5).

It would be appreciated by those skilled in the art that the load mounted on load frame 640 may be fastened by means of straps or by any other means known in the art.

It is within provision of the invention that it be made compatible with the various fittings in an ambulance, allowing it to be easily loaded and locked into place in ambulances transporting the carrying device.

It is within provision of the invention that the wheeled carrying device described be capable of transporting wounded personnel, first aid equipment, hunting gear, game, water, food, weapons, shelter such as tents, communications equipment, and other supplies as may be required or desired by the users. As will be appreciated, the multi-purpose nature of the carrying device is thereby exploited, making movement of independent units such as military units, exploration teams, hiking families with babies, and the like easier even in rough terrain or in devastated urban area.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A wheeled stretcher comprising:
   a chassis comprising a supporting platform supported above a plurality of cross members;
   a front dependent suspension and a rear dependent suspension, wherein each of
      said dependent suspensions comprises a substantially inverted U shaped legged solid axle, a connector, springs, and wheels;
   wherein said legged solid axles of said dependent suspensions each comprise legs extending down from a central bar and are adapted to keep said chassis at least 6 inches above the ground surface
   wherein said connectors are attached to the bottoms of said cross members;
   wherein said central bar is pivotally connected to said connector by a pin such that said central bar is located below said connector and pivots relative to said connector about the axis of said pin and
   to keep said chassis leveled while all of said wheels are in contact with the ground wherein said springs are attached between said central bar and said connector on either side of the pin;
   and
   wherein each wheel is supported in a cantilevered fashion at the lower end of one of said legs with a separate axle from the opposite wheel.

2. The wheeled stretcher according to claim 1 further comprising one or more handles attached to said chassis via a hinged connection.

3. The wheeled stretcher according to claim 1 wherein said front suspension and said rear suspension are connected to said chassis in an angle so that the end of said front suspension that is connected to said wheels, extends outwardly towards a front end of said stretcher; and said end of said rear suspension that is connected to said wheels extends outwardly towards a rear end of said stretcher.

4. The wheeled stretcher according to claim 1 wherein said stretcher is manually driven.

5. A wheeled device comprising:
a chassis comprising a supporting platform supported above a plurality of cross members and one or more hinges facilitating folding of said chassis;
a front dependent suspension and a rear dependent suspension, wherein each of said dependent suspensions comprises a substantially inverted U shaped legged solid axle, a connector, springs, and wheels;
wherein said legged solid axles of said dependent suspensions each comprise legs extending down from a central bar and are adapted to keep said chassis at least 6 inches above the ground surface
wherein said connectors are attached to the bottoms of said cross members;
wherein said central bar is pivotally connected to said connector by a pin such that said central bar is located below said connector and pivots relative to said connector about the axis of said pin and
to keep said chassis leveled while all of said wheels are in contact with the ground wherein said springs are attached between said central bar and said connector on either side of the pin;
and
wherein each wheel is supported in a cantilevered fashion at the lower end of one of said legs with a separate axle from the opposite wheel; and
wherein each wheel is supported in a cantilevered fashion at the lower end of one of said legs with a separate axle from the opposite wheel.

6. The device according to claim 5 wherein folding of said one or more hinges permits two wheels to remain in contact with the ground.

7. The device according to claim 5 wherein said carrying device is a baby stroller.

8. The device according to claim 5 further comprising one or more handles attached to said chassis, via a hinged connection.

9. The device according to claim 5 wherein said front suspension and said rear suspension are connected to said chassis in an angle so that the end of said front suspension that is connected to said wheels, extends outwardly towards a front end of said device; and said end of said rear suspension that is connected to said wheels extends outwardly towards a rear end of said device.

10. The device according to claim 5 wherein said device is usable in both a folded mode and an unfolded mode.

11. The device according to claim 10 wherein in said unfolded mode, the length of said device is adjustable, by deployable extensions extendable frontwards and rearwards from said chassis.

12. The device according to claim 5 wherein said device is manually driven.

13. The wheeled device according to claim 5 wherein said device is foldable and is usable in both a folded mode and an unfolded mode.

14. The wheeled device according to claim 13 wherein in said unfolded mode, the length of said device is adjustable, by deployable extensions extendable frontwards and rearwards from said chassis.

15. The wheeled device according to claim 5, comprising a locking mechanism adapted to restrict motion of portions of said chassis about said one or more hinges.

16. The wheeled device according to claim 15, wherein said locking mechanism comprises a fixed side and a dynamic side.

17. The device according to claim 8, wherein said handles have sufficient space between them to accommodate a person.

* * * * *